United States Patent

May

[19]

[11] Patent Number: 6,111,560
[45] Date of Patent: Aug. 29, 2000

[54] DISPLAY WITH A LIGHT MODULATOR AND A LIGHT SOURCE

[75] Inventor: Paul May, Cambridge, United Kingdom

[73] Assignee: Cambridge Display Technology Limited, Cambridge, United Kingdom

[21] Appl. No.: 08/894,901

[22] PCT Filed: Apr. 17, 1996

[86] PCT No.: PCT/GB96/00924

§ 371 Date: Sep. 2, 1997

§ 102(e) Date: Sep. 2, 1997

[87] PCT Pub. No.: WO96/33483

PCT Pub. Date: Oct. 24, 1996

[30] Foreign Application Priority Data

Apr. 18, 1995 [GB] United Kingdom .................. 9507861
Aug. 11, 1995 [GB] United Kingdom .................. 9516468

[51] Int. Cl.[7] .................................................. G09G 3/36
[52] U.S. Cl. ................................................ 345/102; 345/76
[58] Field of Search .............................. 345/102, 5, 66, 345/76, 94; 349/62, 61

[56] References Cited

U.S. PATENT DOCUMENTS 4,667,189  5/1987  Den Boer et al. ....................... 345/89
4,945,009  7/1990  Taguchi et al. .
5,247,190  9/1993  Friend et al. ............................. 257/40
5,414,442  5/1995  Yamazaki et al. ....................... 345/89
5,835,173  11/1998 Inbar et al. ............................. 345/102

FOREIGN PATENT DOCUMENTS 91 10233  11/1991  WIPO .
93 13514  8/1993   WIPO .

OTHER PUBLICATIONS

Journal of Applied Physics, vol. 65, No. 9, May 1, 1989, pp. 3610–3616, XP000038779 Tang C W et al: "Electroluminescence of Doped Organic Thin Films".

*Primary Examiner*—Regina Liang
*Attorney, Agent, or Firm*—Merchant & Gould P.C.

[57] ABSTRACT

A display comprises a light modulator defining an array of pixels arranged in rows (2) and columns (3) and addressable to select between at least an opaque state for each pixel and a transparent state for each pixel. The display includes a light emitting device arranged adjacent the light modulator to act as a light source for the display. The light modulator is a passive matrix liquid crystal display device and the light source is an electromumninescent LED. The light source is addressable to emit light from selected regions LER, each region overlapping at least a plurality of rows (2) of the light modulator. In this way, the problem of electrical cross-talk in the display is reduced.

16 Claims, 3 Drawing Sheets

DISPLAY WITH A LIGHT MODULATOR AND A LIGHT SOURCE

FIELD OF THE INVENTION

This invention relates to a display, and particularly to a display comprising a light modulator and a light source.

BACKGROUND OF THE INVENTION

Liquid crystal devices are the dominant technology presently used as light modulators in flat-panel displays. They operate by a shuttering principle in which selected pixels of the display are chosen—normally by application of an electric field across the liquid crystal layer—either to block or to transmit light. This occurs through a change in the optical properties of the liquid crystal material, often in combination with a static optical element such as a polariser. Thus a pattern of dark and bright pixels can be formed dynamically. The light required for an image to be seen can either be provided by a light source behind the liquid crystal shutter (i.e. the other side of the liquid crystal layer from the observer) or in front. In the latter case the light is either blocked, or transmitted and then reflected back to the observer. In general for graphic displays (high information content with a large number of pixels, typically >10,000), the light source takes the form of a backlight to the liquid crystal device. The power efficiency of the display is determined by a combination of the efficiency of the backlight, and the efficiency of transmission through the liquid crystal shutter when it is open. For colour displays, where red, green and blue absorbing filters are used to provide individual colours to each pixel, the typical efficiency overall is about 2 to 5%.

Pixels are selectively controlled to transmit or block light by electrically addressing the display. Row and column electrodes are provided which define pixels where they overlap. Row and column drivers apply voltages respectively to the row electrodes and column electrodes.

One of the most common configurations for such flat panel displays is passive matrix addressing, where line by line addressing of a display takes place through application of row selection voltages to select each row in turn while data voltages are applied to the columns. In this way individual pixels in each line are selected by selection of the field applied across each pixel in the line, the field being dependent on the difference between the row selection voltage and the data voltage. Each row in turn is selected until a whole frame has been addressed. Liquid crystal material does not respond immediately to a change in applied field. The time for a liquid crystal to change its state is its response time. Most liquid crystal devices use liquid crystals that have a response time that is of the same order as the frame time That is, by the time a frame has been addressed, selected pixels in the first rows will have changed state. The state is determined by the root mean square voltage $V_{rms}$ applied during the frame. The idea is that the final state of any pixel will be determined ideally by the column data voltage applied during row selection of that pixel. Thus a differential in $V_{rms}$ is created between selected pixels and non-selected pixels. One potential difficulty with this scheme is cross-talk between rows, which means that pixels in rows that are not selected may be affected by the column data voltages intended for selected rows—i.e. the field across a pixel in a given row will change even when that line has not been selected. The effect to the viewer of this cross-talk is reduced contrast of the image.

Where the response time of the liquid crystal is faster than the frame time, then by choosing suitable row select and column data (pixel on and off) voltages the number of lines which have been addressed before the liquid crystal changes state is reduced, and thus the cross-talk problem which arises as outlined above diminishes. However, when the liquid crystals are designed for higher speed operation, other problems can arise. For video rate operation of a display then the frame time for a display needs to be less than 20 ms (allowing flicker free presentation of images to the eye). The ratio of the row select to column data voltages required to prevent crosstalk in a display depends on the number of lines—one model proposes a proportional relationship of this ratio with the square root of the number of lines. In a fast liquid crystal, an incorrect response by pixels in a selected row is possible due to the typically large size of the row select voltage to the data voltage ratio for typical line numbers of graphic displays (i.e. over 200). This effect also leads to a reduced viewer contrast. These issues have been studied in detail over the last few years, and are reported in the literature e.g. Electronic Display Devices, ed by S. Matsumoto and published by John Wiley in 1990.

To produce graphic displays at video rate operation with high contrast, the most common approach is the so-called active matrix addressing, where a thin film transistor is placed at each pixel. The transistors are addressed to transmit voltages which can cause the liquid crystal material to change its optical state. The voltage threshold for switching of the transistor is much sharper than for the liquid crystal material and therefore the cross-talk problem does not occur. The problem with this approach is cost.

Another approach (the so-called active addressing scheme) does not require a transistor at each liquid crystal pixel, but relies on simultaneous application of time varying voltages to rows and columns, where the voltage sequence is calculated in real-time by on-board signal processing chips that determine the driver voltages. This is also a high cost approach.

Another approach (so-called multiscan) effectively reduces the number of individually addressed lines in the display by having separate column drivers to divide the screen into different parts so that selected rows are addressable in parallel. This reduces the number of lines per part and so allows a reduction of the row selection voltage, thus avoiding the incorrect response problem described above, but requires extra numbers of column drivers.

Reference is made to WO91/10223 which describes a backlighted LCD display formed by placing a single matrix of LCDs over a bank of red, green and blue fluorescent lamps. That arrangement is intended to improve the efficiency of a colour display, by avoiding the use of absorbing filters in the display itself. It does not however attempt to address the cross-talk problems discussed above.

Reference is also made to WO93/13514 which also describes a colour fluorescent backlight for a liquid crystal display. In that device, a plurality of phosphorescent strips capable of emitting red, green or blue light are disposed in a vacuum chamber-to constitute a backlight. The document discusses the possibility of optical cross-talk between adjacent rows of LCD pixels due to the spread of light from the backlight, but makes no attempt to address the difficulties associated with the problem of electrical cross-talk as outlined above.

It is an object of the invention to provide a display which can be addressed by a passive matrix system with simple drive circuitry but which does not have a cross-talk problem at high frame rates. In this context, "high" can mean for example >10 Hz.

According to the present invention there is provided a display comprising a light modulator defining an array of pixels arranged in rows and columns and addressable to select between at least an opaque state for each pixel and a transparent state for each pixel, the light modulator comprising a layer of liquid crystal material disposed between a first set of row electrodes and a second set of column electrodes, said pixels being defined where the row electrodes and column electrodes overlap; and a light emitting device arranged adjacent the light modulator to act as a light source for the display and addressable to emit light from selected regions, each region overlapping at least a plurality of said rows, the light emitting device comprising a layer of an organic electroluminescent material arranged between a first substantially planar electrode and a plurality of substantially planar second electrodes, overlapping said first electrode, each second electrode defining with the first electrode one of said light emitting regions.

Thus, the invention provides a backlight which is composed of selectively actuatable light emitting regions that need not all be simultaneously selected. A simple passive matrix display with a backlight can consequently be used without undue deterioration in contrast because the number of lines visible at any time is reduced, only the row s overlapping a selected light emitting region are visible. Cross-talk in the light modulator will not affect the observed image because the backlight behind the prospective cross-talk areas will not be selected,land therefore that part of the image affected by the cross-talk area is not observable. This allows for lower row selection voltages because of the reduced effective line number, and therefore the ratio of row select to data voltage can be reduced thus avoiding the in stantaneous response problem in fast displays. For example, voltages may be <20V for a row select voltage and 2V for column data voltage, giving a ratio of <10.

In the described embodiment, addressing circuitry is provided for sequentially addressing each of a plurality of said rows while one of said regions is selected to emit light. The addressing circuitry comprises column drive circuitry for applying, for each selected row, data voltages on selected ones of said column electrodes; and row addressing circuitry for sequentially addressing said rows. The addressing circuitry further comprises selection circuitry for sequentially selecting said regions to emit light, selection of said regions being synchronised with operation of said row addressing circuitry to address said rows so that after each plurality of rows has been addressed, a next region is selected to emit light.

The light emitting layer can be a semiconductive conjugated polymer such as polyphenylenevinylene (PPV) or its derivatives. Alternatively, it can take the form of an organic molecular film which, when excited, emits light. Suitable organic molecular films are disclosed in C. W. Tang, S. A. Van Slyke and C. H. Chen, J. Appl. Phys., 65, 3610 (1989).

The present invention can be used to advantage in a colour display wherein each light emitting region can be arranged selectively to emit light of a different colour. In one embodiment this is achieved by providing for each light emitting region a plurality of different zones arranged adjacent one another to emit light of respectively different colours which can be selectively actuated. Alternatively, different zones can be arranged overlapping one another (or stacked) to emit light of respectively different colours.

The invention also provides a method of addressing a display comprising a light modulator defining an array of pixels arranged in rows and columns and a light emitting device arranged adjacent the light modulator to act as a light source for the display and having a plurality of selectable light emitting regions, each region overlapping at least a plurality of said rows, in which method a first of said light emitting regions is selected to emit light while each of the plurality of rows overlapped by said light emitting region are addressed in sequence and, when said plurality of rows have been addressed, the first light emitting region is deselected and a next light emitting region is selected.

Thus, a passive addressing scheme can be used while overcoming the cross-talk and response time problems associated with the prior art. A multi-line scan approach is also possible with this invention.

BRIEF DESCRIPTION OF THE DRAWINGS

For a better understanding of the present invention and to show how the same may be carried into effect reference will now be made by way of example to the accompanying drawings.

DESCRIPTION OF THE PREFERRED EMBODIMENT

Figure 1:
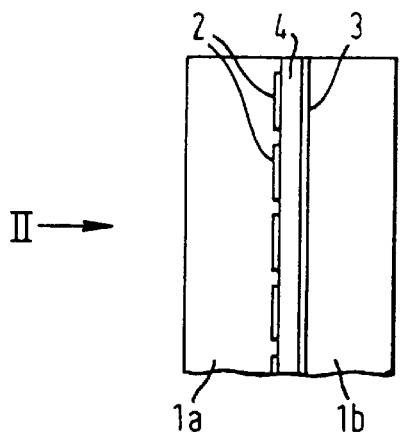
FIG. 1 is a side view of a light modulator.

FIG. 1 is a side view of a liquid crystal light modulator. A layer 4 of liquid crystal material is sandwiched between two glass substrates 1a, 1b. On the first glass substrate 1a are defined row conducting electrodes 2 in contact with the liquid crystal layer. On the second glass substrate 1b are defined column conducting electrodes 3 in contact with the liquid crystal layer 4. To allow transmission of light through the liquid crystal modulator, these electrodes are typically transparent. The arrangement of the row and column electrodes 2,3 is shown more clearly in FIG. 2 which is a plan view of a liquid crystal modulator. Thus, the row electrodes extend horizontally and the column electrodes extend vertically. Where the row and column electrodes overlap, pixels P are defined in the liquid crystal layer 4. These pixels constitute addressable regions which can be controlled by voltages applied to the row and column electrodes 2,3 to be transmissive (i.e. to transmit light) or to be opaque (i.e. to block light). The state of the pixels P depends on the magnitude of electric fields applied between the row and column electrodes at the point of overlap defining the respective pixels.

Liquid crystal modulators of this type are known per se and are described for example in "Liquid Crystal TV Displays" by E. Kaneko, published by D. Reidel Publishing Co., 1987, the contents of which are herein incorporated by reference. One suitable liquid crystal alignment configuration is a Super Twisted Nematic (STN). For suitable materials, this has a high response time, typically <<100 ms.

In a display, a light source is arranged behind a liquid crystal modulator so that selective blocking or transmitting of light by the selectively addressed pixels P allows images to be viewed.

Figure 3:
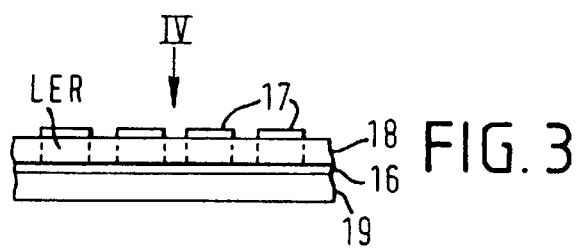
FIG. 3 is a diagrammatic sectional view through a light emitting device.
Figure 4:
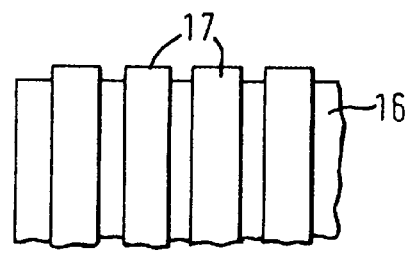
FIG. 4 is a plan view taken in the direction of arrow IV in FIG. 3.

In accordance with the invention, a light source (so-called backlight) is provided which has selectively addressable light emitting regions, each of which regions overlap at least two rows of the liquid crystal modulator. One embodiment of a suitable backlight is illustrated in FIGS. 3 and 4. FIG. 3 is a section through a light emitting polymer device used as a patterned backlight. Reference numeral 19 denotes a transparent substrate which carries a coating of indium tin oxide 16 which acts as a transparent anode. A light emitting polymer layer 18 is deposited on the anode layer 16. A patterned aluminium cathode 17 is then arranged on the polymer layer 18. The patterned aluminium regions 17 of the cathode define in the light emitting polymer layer 18 light emitting regions LER the function of which is more clearly described hereinafter.

FIG. 4 is a plan view showing the patterning of the aluminium cathode in more detail. That is, the aluminium cathode is defined as strips 17 of aluminium defining strip-like light emitting regions LER. The polymer layer 18 is selected so that it emits light when electrically excited. Electrical excitation takes place by application of a voltage between the anode 16 and one of the cathode regions 17 which cause charge carriers of opposite types to be injected into the polymer layer 18. These charge carriers recombine and decay radiatively to cause light to be emitted from the polymer layer 18. The construction of such light emitting devices is known from, for example, U.S. Pat. No. 5,247,190, the contents of which are herein incorporated by reference. A particularly suitable polymer is polyphenylenevinylene (PPV) or a derivative thereof. In addition to the light emitting layer 18, an additional polymer layer can be included to act as a charge transport layer or an additional light emitting layer.

Figure 2:
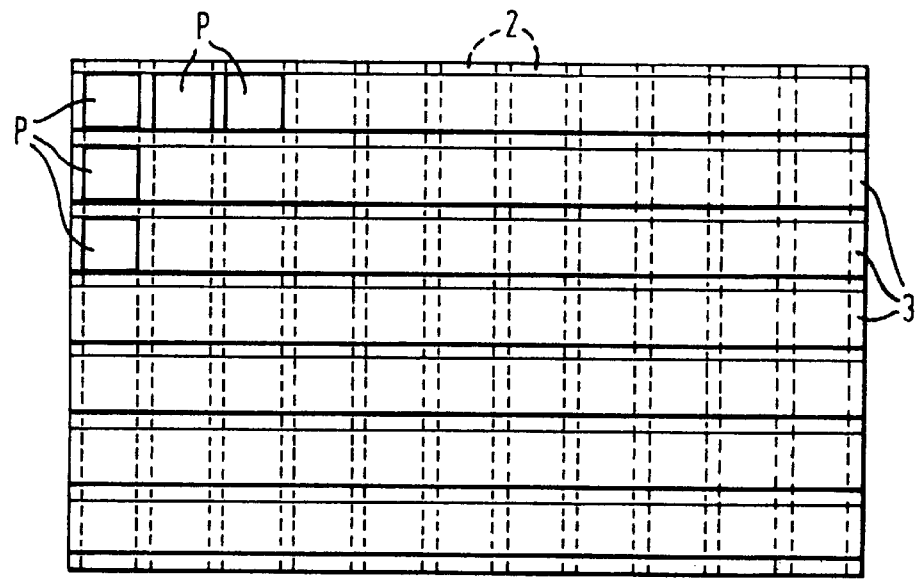
FIG. 2 is a view from the front taken in the direction of arrow II in FIG. 1.
Figure 5:
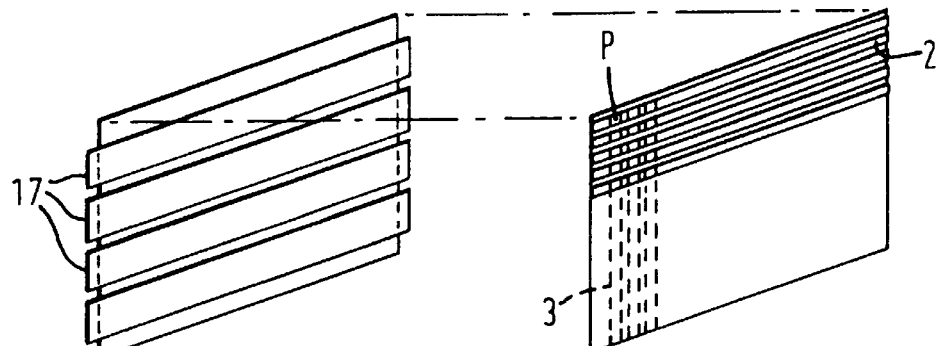
FIG. 5 is a sketch illustrating how the display of the invention is constructed.
Figure 6:
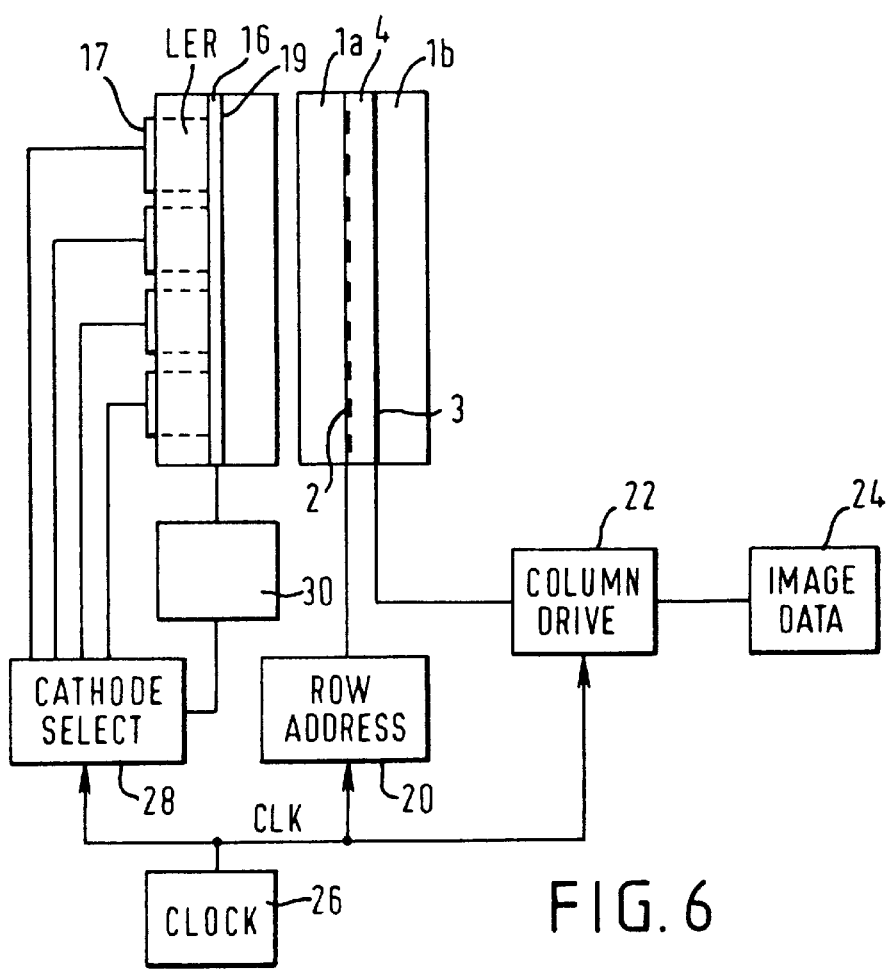
FIG. 6 is a block diagram illustrating the addressing circuitry for the display.

FIG. 5 is a sketch illustrating how a display is manufactured using the liquid crystal modulator of FIGS. 1 and 2 and the patterned backlight of FIGS. 3 and 4. That is, the patterned backlight and the liquid crystal modulator are coupled together so that the light emitting regions LER defined by the cathode strips 17 extend row-wise of the liquid crystal modulator, with each strip overlapping a plurality of row electrodes 2. The patterned backlight can be proximity coupled to the liquid crystal modulator or placed in direct contact with the glass substrate of the liquid crystal modulator. Alternatively, optical coupling via a lens is possible. The construction of a display is shown in more detail in section in FIG. 6. The illustration in FIG. 6 is diagrammatic only, but in one example each light emitting region LER of the patterned backlight overlaps three rows 2 of the liquid crystal modulator. Addressing circuitry for the display is also shown in FIG. 6. The addressing circuitry comprises row addressing circuitry 20 for selectively addressing row electrodes 2 of the liquid crystal modulator. A column drive circuit 22 selectively applies the required voltage to the column electrodes 3. An image data store 24 holds image data for controlling the column drive circuit 22. A clock circuit 26 generates a clock signal CLK which controls the timing of the signals output from the column drive circuit 22 and also the sequence of selecting cathode regions 17 via a cathode select circuit 28. The cathode select circuit selectively connects an LEP driver circuit 30 between the anode 16 and the selected one of the cathode regions 17.

The clock circuit 26 ensures that there is synchronisation between sequential addressing of the backlight regions LER and selection of pixels in individual rows illuminated by the selected backlight emission region. Thus, within each frame, a first one of the cathode regions 17 is selected so that light is emitted from the associated light emitting region LER. A first one of the three rows overlapping that light emitting region is addressed and appropriate column data placed on the columns 3 to cause selected ones of the pixels in that row to become opaque. While the same light emitting region is activated, the first row is deselected and the second row is addressed and appropriate column data loaded onto the column electrodes. Then the second row is deselected and the third row is addressed and appropriate column data loaded onto the column electrodes 3. Then, that light emitting region is deactivated by selecting the next cathode region for activation via the cathode select circuit 28. The next three rows overlapping that light emitting region are then sequentially addressed. In the example shown, there are four light emitting regions which are sequentially addressed four times faster than the required frame rate. The frame rate is the time taken to fully generate one frame of the image. Thus, to maintain the brightness required by the display, the brightness of each light emitting region has to be four times higher than would be required for a continuous backlight configuration, that is where the backlight is not split into separate light emitting regions.

Figure 7:
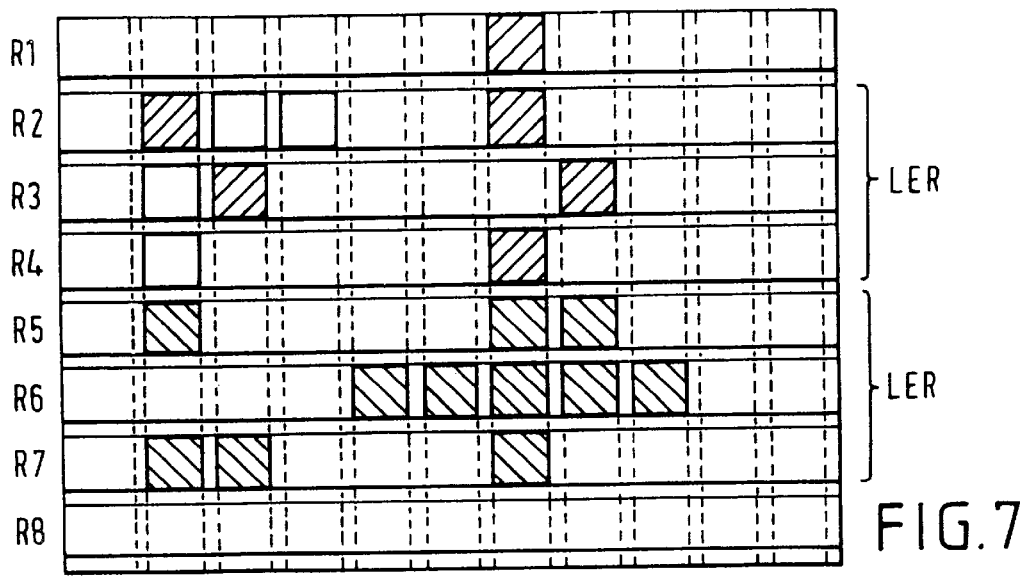
FIG. 7 is a plan view of the display as in FIG. 2, showing selectively addressed pixels and light emitting regions.

FIG. 7 is a front view of the display for the two intermediate light emitting regions. That is, R1 denotes the third row overlapping the first light emitting region, R2 to R4 are the three rows overlapping the second light emitting region, R5 to R7 are the three rows overlapping the third light emitting region, R8 is the first row of the fourth light emitting region. Pixels which are cross-hatched denote pixels which are in a fully transmissive state but which cannot be seen because they are not backlit. Pixels which are fully hatched denote pixels which are in a fully transmissive state and visible because they are backlit. The other pixels are in an opaque state. In the state illustrated in FIG. 7, rows R2 to R4 have just been addressed and rows R5 to R7 are currently being addressed. The third light emitting region is activated to provide a backlight for rows R5 to R7 while they are being addressed. The cross-hatched pixels in rows R2 to R4 have been properly rendered transmissive by addressing, although they are no longer visible because the area is not backlit. However, the cross-hatched pixel in row R1 has been incorrectly rendered transmissive due to cross-talk as a result of the voltage applied to rows R1 to R7. However, this false state is not observable and therefore there is no reduction in contrast. Row R8 has not yet been addressed. If any pixels in row R8 or subsequent rows were to adopt a transmissive state falsely, due to cross-talk, these too would not be observable because the region is not backlit.

It will be apparent that in the described embodiment the size of each light emitting region is selected to allow high speed switching of the rows of the liquid crystal modulator in front of a selected region (for example consistent with video frame rate), but without cross-talk between addressed rows and non-addressed rows in front of the same region. Cross-talk between addressed and non-addressed rows not in front of the same light emitting region is not a problem, because only one light emitting region is selected at any given time. As is apparent from the above description, the light emitting regions are sequentially addressed in synchronisation with the addressing of the liquid crystal modulator. There could be a fixed timelag introduced between the spatial position of a row being addressed and the switching of the light emitting region behind that row.

While the described embodiment provides an arrangement in which adjacent cathode strips 17 are sequentially addressed, it will be apparent that it would be possible to switch on simultaneously alternate light emitting regions with the same benefit of reduced effect of cross-talk, while allowing a reduction in the brightness required by each light emitting region.

In the above description, reference has been made to fully transmissive or fully blocking liquid crystal pixels. It will be apparent however that it is possible for liquid crystal pixels to have a greyscale corresponding to intermediate transmissive states, and that the invention is still valuable with such an arrangement. Moreover, full colour displays are possible by using a white backlight source in combination with a liquid crystal modulator that has red, green and blue pixels defined by association of filters of the same colours in front of appropriate pixels. Such liquid crystal modulators are known per se.

Figure 8:
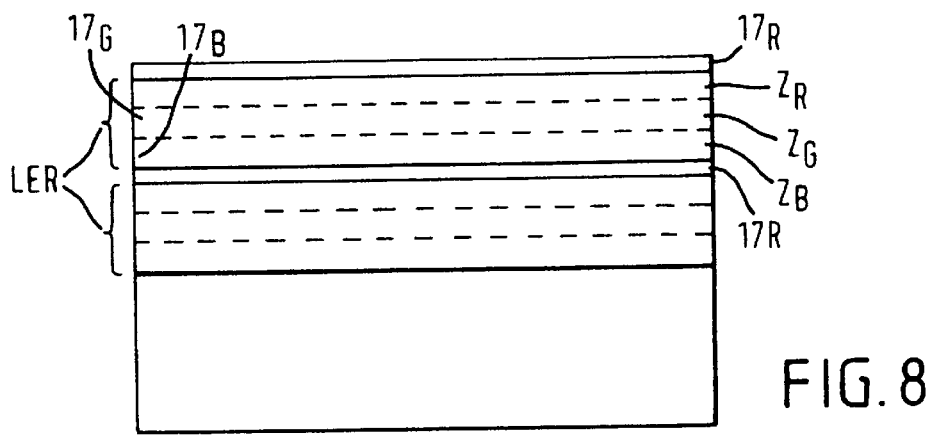
FIG. 8 is a diagram illustrating one embodiment of a colour light source.

A different approach to generating a colour display will now be described with reference to FIGS. 8 and 9. In the embodiment of FIG. 8, the light emitting regions each comprise three separately addressable zones of different colours, red, blue and green. In this way, the colour of the light emitting region can be controlled. Two light emitting regions are shown in FIG. 8. Each light emitting region comprises a red zone $Z_R$, a green zone $Z_G$ and a blue zone $Z_B$. The red, green and blue zones are formed from different polymer materials emitting light at different wavelengths deposited directly by printing techniques. Alternatively, a combination of coating and etching processes can be used. Each zone is addressable by a separate anode strip $17_R$, $17_G$, $17_B$ respectively. Thus, not only does the backlight have separately addressable light emitting regions LER, but the colour of each light emitting region can be chosen by selectively arranging for the red zone, green zone, blue zone or some combination of these to be activated.

Each light emitting region does not need to have adjacent zones of different colour emissions. Instead, different colours could be obtained by multilayer structures or by blends. For example, one alternative is by mixing different polymers in the same layer and using different voltages to access different colours as described for example in "Light emitting diodes with variable colours from polymer blends", by M. Berggren et al, Nature, vol. 372, pages 444–446, whose contents are herein incorporated by reference. Another alternative is by depositing an homogenous copolymer layer and using different processing conditions for each layer as described in our U.S. Pat. No. 5,328,809. A further alternative is to provide a stacked structure of different colour backlights (that is separate substates and electrodes for each colour). In this regard reference is made to our copending British Application No. 9507862.2 filed Apr. 18th 1995, the contents of which are herein incorporated by reference. Each device can be divided into selectively addressable light emitting regions.

With this approach, colour filters are not required in the liquid crystal modulator itself.

Control of the colour of emitted light can be done in a variety of different ways. For example, the colour for each light emitting region can be determined prior to each frame, with the light emitting regions then being addressed sequentially according to the predetermined colour. Alternatively, each colour within a light emitting region could be sequentially addressed before the next light emitting region is addressed. As a further alternative, some combination of the two techniques could be used.

Figure 9:
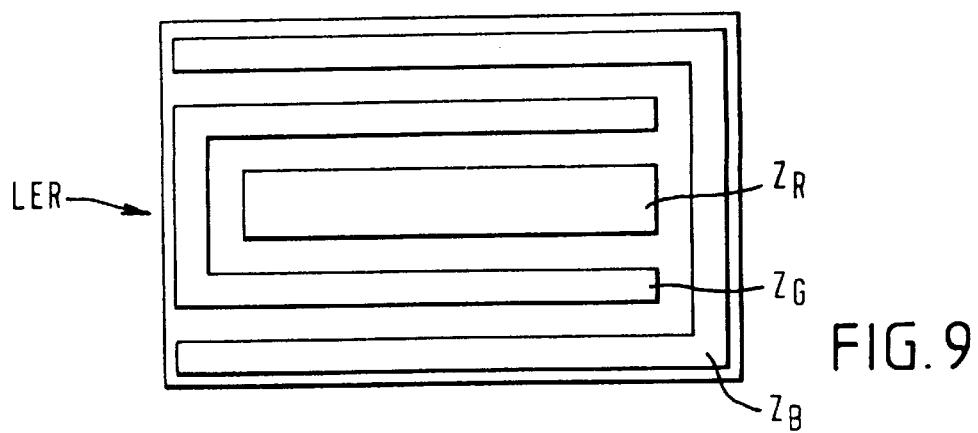
FIG. 9 is a diagram of another embodiment of a colour light source.

FIG. 9 represents one way in which each light emitting regions can be patterned to provide light emitting zones of different colours. There is a central red block $Z_R$, a green block $Z_G$ located around the central red block, and finally a blue block $Z_B$ surrounding the green block. This layout minimises any "stripey" effect when different colours in each region are selected, since a large part of the light emitting region is covered by each colour distributed more uniformally over the width (row-wise) of the light emitting region.

With the arrangement of FIGS. 8 and 9, different light emitting regions can be simultaneously addressed with different colours. Because the light emitting regions emit light of different colours, the likelihood of cross-talk is small if different colours use different column signal lines.

The advantage or providing a coloured backlight is the relative ease of patterning the colour addressable backlight compared to the patterning of pixelated colour filters for liquid crystal displays.

The present invention can be used in any areas where displays are required. In particular, it is useful for graphic displays which need to be rendered at high frame rates, for example for television, video or computing applications. For some of these applications, frame rates in excess of 10 Hz are required.

What is claimed is:

1. A display comprising:
a light modulator defining an array of pixels arranged in rows and columns and addressable to select between at least an opaque state for each pixel and a transparent state for each pixel, the light modulator comprising a layer of liquid crystal material disposed between a first set of row electrodes and a second set of column electrodes, said pixels being defined where the row electrodes and column electrodes overlap;
a light emitting device arranged adjacent the light modulator to act as a light source for the display and addressable to emit light from selected regions, each region overlapping at least one of said rows, the light emitting device comprising a layer of an organic electroluminescent material arranged between a first substantially planar electrode and a plurality of substantially planar second electrodes, overlapping said first electrode, each second electrode defining with the first electrode one of said light emitting regions; and
addressing circuitry comprising column driver circuitry for applying, for each selected row, data voltages on selected ones of said column electrodes, and row addressing circuitry for sequentially addressing said rows with a row select voltage, wherein the ratio of the row select voltage to the data voltages is less than ten.

2. A display according to claim 1 wherein the liquid crystal material is in a super twisted nematic (STN) alignment configuration.

3. A display according to claim 1, wherein said addressing circuitry further comprises selection circuitry for sequentially selecting said regions to emit light, selection of said regions being synchronised with operation of said row addressing circuitry to address said rows so that after each of the at least one row has been addressed, a next region is selected to emit light.

4. A display according to claim 3, wherein said selection circuitry, said row addressing circuitry and said column drive circuitry are controlled by a common clock circuit to ensure synchronisation thereof.

5. A display according to claim 1, wherein the light emitting layer comprises a semiconductive conjugated polymer.

6. A display according to claim 5 wherein the semiconductive conjugated polymer is polyphenylenevinylene (PPV) or a derivative thereof.

7. A display according to claim 6 wherein the first electrode constitutes an anode of indium tin oxide and the second electrodes constitute cathodes of aluminium.

8. A display according to claim 1, wherein the light emitting layer comprises an organic molecular film.

9. A display according to claim 1, wherein each region of the light source is arranged to selectively emit light of one of a plurality of colours.

10. A display according to claim 9 wherein each region of the light source comprises a plurality of adjacent light emitting zones operable to emit light of respectively different colours.

11. A method of addressing a display including a light modulator having a layer of liquid crystal material disposed between a first set of row electrodes and a second set of column electrodes, pixels being defined where the row electrodes and the column electrodes overlap; and a light emitting device arranged adjacent the light modulator to act as a light source for the display and having a plurality of selectable light emitting regions, each region overlapping at least one of said row electrodes, in which method a first of said light emitting regions is selected to emit light while each of the at least one row electrodes overlapped by said first light emitting region is addressed in sequence and, when each of the at least one row electrodes have been addressed, the first light emitting region is deselected and a next light emitting region is selected, wherein the method comprises directly addressing each pixel by simultaneously applying a row select voltage to the selected row electrodes on one side of the liquid crystal material and a column data voltage to the selected column electrodes on the other side of the liquid crystal material, the ratio of the row select voltage to the column data voltage being less than ten.

12. A method according to claim 11, wherein the selection of said rows, the application of column data to said columns and the sequential addressing of the light emitting regions are controlled by a common clock circuit to ensure synchronisation thereof.

13. A method according to claim 12, wherein each light emitting region is arranged to selectively emit light of one of a plurality of colors, the method comprising selecting an appropriate one of said colors when the light emitting region is selected.

14. A method according to claim 11, wherein each light emitting region is arranged to selectively emit light of one of a plurality of colours, the method comprising selecting an appropriate one of said colours when the light emitting region is selected.

15. A display comprising:

a light modulator defining an array of pixels arranged in rows and columns and addressable to select between at least an opaque state for each pixel and a transparent state for each pixel, the light modulator comprising a layer of liquid crystal material having a response time of less than 100 ms disposed between a first set of row electrodes and a second set of column electrodes, said pixels being defined where the row electrodes and column electrodes overlap;

a light emitting device arranged adjacent the light modulator to act as a light source for the display and addressable to emit light from selected regions, each region overlapping at least one of said rows, the light emitting device comprising a layer of an organic electroluminescent material arranged between a first substantially planar electrode and a plurality of substantially planar second electrodes, overlapping said first electrode, each second electrode defining with the first electrode one of said light emitting regions; and addressing circuitry comprising column driver circuitry for applying, for each selected row, data voltages on selected ones of said column electrodes, and row addressing circuitry for sequentially addressing said rows with a row select voltage, wherein the ratio of the row select voltage to the data voltage is less than ten.

16. A method of addressing a display comprising a light modulator comprising a layer of liquid crystal material having a response time of less than 100 ms disposed between a first set of row electrodes and a second set of column electrodes, pixels being defined where the row electrodes and column electrodes overlap; and a light emitting device arranged adjacent the light modulator to act as a light source for the display and having a plurality of selectable light emitting regions, each region overlapping at least one of said rows, in which method a first of said light emitting regions is selected to emit light while each of the at least one rows overlapped by said light emitting region are addressed in sequence and, when each of the at least one rows have been addressed, the first light emitting region is deselected and a next light emitting region is selected, wherein the method comprises directly addressing each pixel by simultaneously applying a row select voltage to selected row electrodes on one side of the liquid crystal material and a column data voltage to selected column electrodes on the other side of the liquid crystal material, the ratio of the row select voltage to the data voltage being less than ten.

* * * * *